Dec. 28, 1926.

A. KINDERMANN 1,612,380

POTATO PEELING MACHINE

Filed March 25, 1925 2 Sheets-Sheet 1

Inventor:

Dec. 28, 1926.

A. KINDERMANN

POTATO PEELING MACHINE

Filed March 25, 1925

Inventor:
August Kindermann

Patented Dec. 28, 1926.

1,612,380

UNITED STATES PATENT OFFICE.

AUGUST KINDERMANN, OF HERFORD, GERMANY.

POTATO-PEELING MACHINE.

Application filed March 25, 1925, Serial No. 18,163, and in Germany June 2, 1924.

This invention relates to a machine for peeling potatoes in which, in a casing between two rollers mounted parallel to one another and carrying each a knife-disk or circular knife said rollers being designed to hold the potato to be peeled, a flat ring is arranged in vertical position, said ring having teeth in its outer circumference and carrying knives. The ring is mounted between guide rollers fixed in the walls of the casing.

An embodiment of the invention is shown by way of example in the accompanying drawing in which—

Fig. 1 is a side elevation,

Fig. 2 an end view and

Fig. 3 a plan view.

Figure 1:
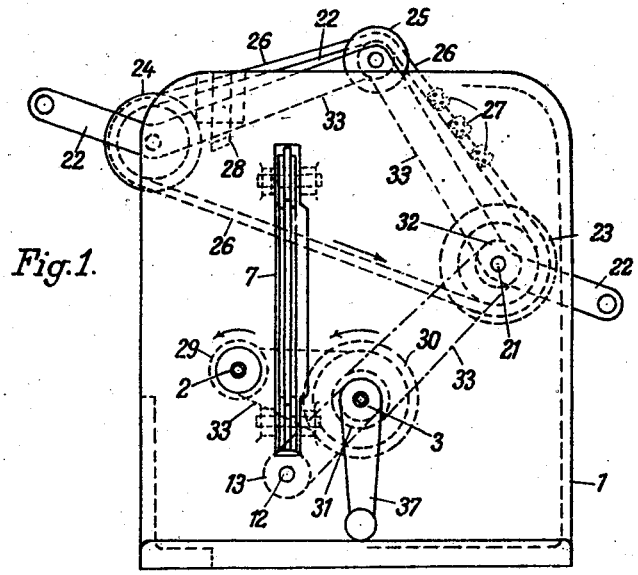
Figure 3:
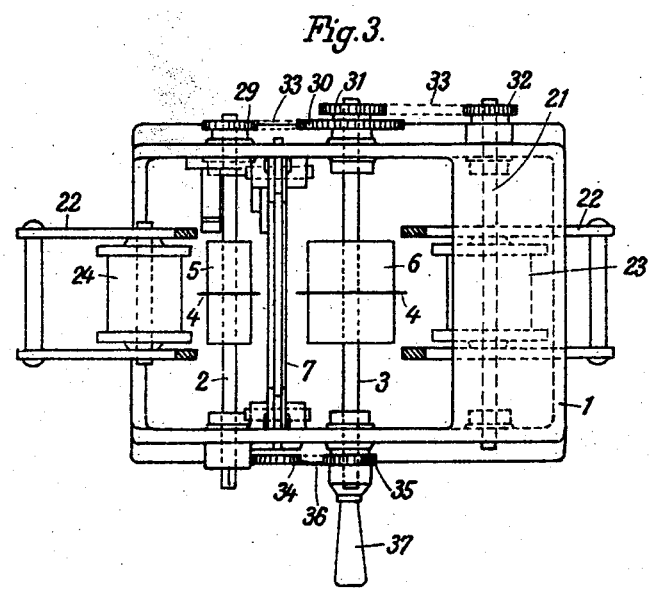

On each of two shafts 2 and 3 journalled in the long sides of a casing 1, rollers 5 and 6 respectively are mounted, each roller carrying at the middle a circular knife 4. Between the rollers 5, 6 a vertical flat annular ring 7 is mounted so that it can rotate between flanged rollers 8, 9, 10, 11 fixed on the surface of the long walls of the casing. The flat annular ring 7 has teeth in its outer circumference with which meshes a worm 13 keyed on the shaft 12. On the inner circumference of ring 7 knife-holders 14, 15 are hingedly fixed which carry each a peeling knife 16, 17 respectively. These knife holders 14, 15 are securely held in the position of rest on the inner circumference of ring 7 by means of clamping blade springs 18. Two elbow levers 19 mounted on the side of ring 7 serve to control the blade springs 18 so that they release the knife-supports so that they can be oscillated by the action of springs 20. On an axle 21 mounted in the long walls of the casing 1 a rocking frame 22 composed of two flat irons is loosely mounted. In this rocking frame a guide roller 23 is keyed on shaft 21, and the axles of two other guide rollers 24, 25 are fixed in the rocking frame. A conveyer band 26 passing through the ring 7 is guided over the rollers 23, 24, 25. On the middle of the conveyer band accurately above the circular knives 4 of the rollers 5, 6 small knife blades 27 are attached. In the position of rest e. g., in the highest position, the rocking frame 22 is securely held by the action of a blade spring 28. The shafts or axles 2, 3 and 21 are connected with one another by chains 33 guided over sprocket wheels 29, 30, 31 and 32, arranged on the outer surface of the left long wall of the casing.

The diameters of the sprocket wheels are selected so that the circumferential speeds of the rollers 5, 6 and 23 are equal. The worm shaft 12 is connected to the shaft 3 by chain 36 and sprocket wheels 34, 35, arranged on the outer surface of the right long wall of the casing. The end of shaft 3 which projects from the right long side wall of the casing is square and designed to receive the crank handle 37 for driving the machine.

The operation is as follows:—

Figure 2:
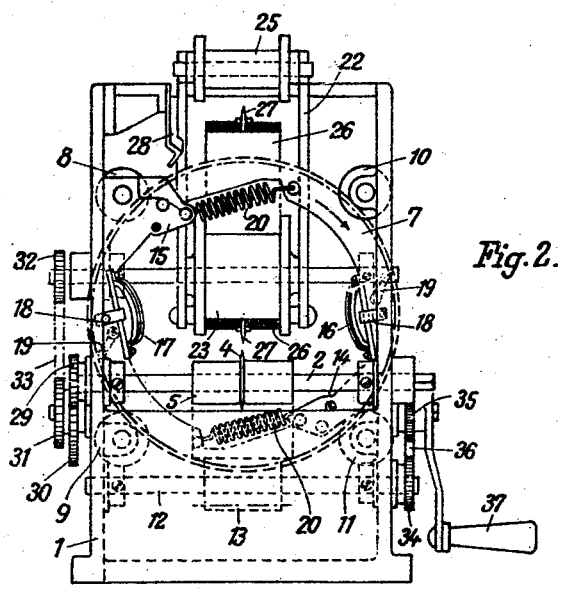
Figures 4, 5:
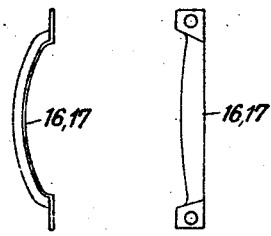
Figs. 4 to 6 show a peeling knife, on larger scale, respectively in plan view, front and side elevation.
Figures 7, 8:
Figs 7 and 8 show in front and end elevation, and on larger scale than used in Figs. 1 to 3, one of the knives mounted on a conveyer band.
Figure 6:
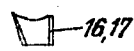

The potato to be peeled is pressed upon the circular knives of the rollers 5, 6 and the conveyer band 26 is lowered upon the potato by means of the rocking frame 22, whereupon the knife support 14 is released through the intermediary of the elbow lever 19 so that the peeling knife 16 is pulled by the action of spring 20 onto the potato. If the crank handle 37 is rotated in the direction of the arrow (Fig. 1) a rolling movement is communicated to the potato by the rollers 5, 6. The peeling knife 16 moves during the peeling around the potato in the direction indicated by the arrow (Fig. 2) and if the knife has completed about one half of its travel the potato is peeled so that it can be removed from the machine. During the peeling incisions have been made into the peeled potato by the circular knives 4 on rollers 5, 6 and by the knife blades 27 on the conveyor band 26, said incisions serving to facilitate cutting the potato into chips.

The second potato is peeled by the knife 17, which, during the peeling of the first potato has advanced to the point from which the peeling knife 16 has started.

The operation described is repeated as long as the crank handle is rotated.

An abutment on the left long wall of the casing serves for returning into the position of rest the peeling knife 16 or 17 which has just worked.

I claim:—

1. A potato peeling machine comprising in combination with a casing two horizontal shafts journaled in the side walls of said casing, a roller on each shaft, a circular knife on each roller, a vertical annular disk toothed on the outer circumference rotatably mounted in said casing between said rollers, guide rollers between which said annular disk is guided, peeling knives on the inner circumference of said annular disk, and means for rotating all said elements.

2. A potato peeling machine comprising in combination with a casing two horizontal shafts journaled in the side walls of said casing, a roller on each shaft, a circular knife on each roller, a vertical annular disk toothed on the outer circumference rotatably mounted in said casing between said rollers, guide rollers between which said annular disk is guided, peeling knives on the inner circumference of said annular disk, means for rotating all said elements, a rocker frame oscillably mounted in said casing above said annular disk, three guide rollers in said rocking frame, a conveying band guided over said rollers so that its lower side passes through said annular disk, and knife blades on said conveying band designed to make incisions into the peeled potatoes.

In testimony whereof I affix my signature.

AUGUST KINDERMANN.